June 18, 1957 C. F. SPANG ET AL 2,795,816
HAMBURG PATTY MAKING MACHINE
Filed April 19, 1954 4 Sheets-Sheet 2
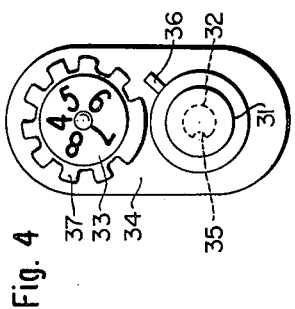
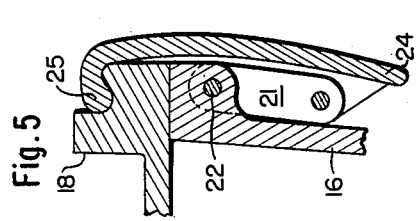
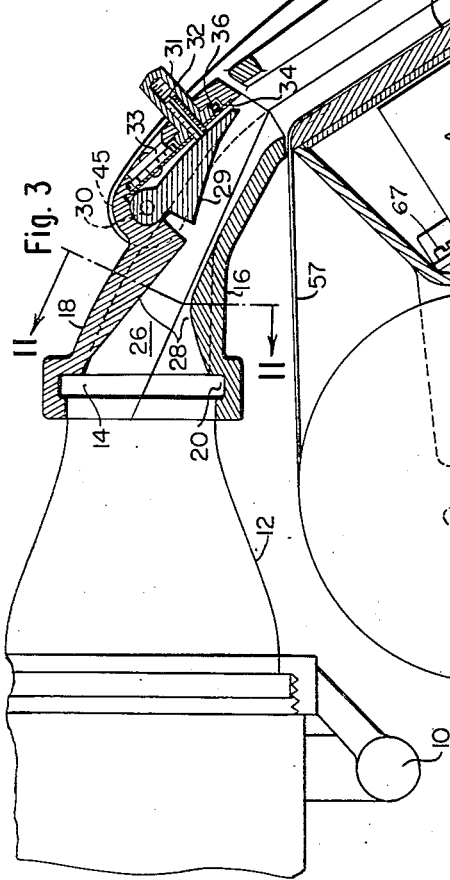
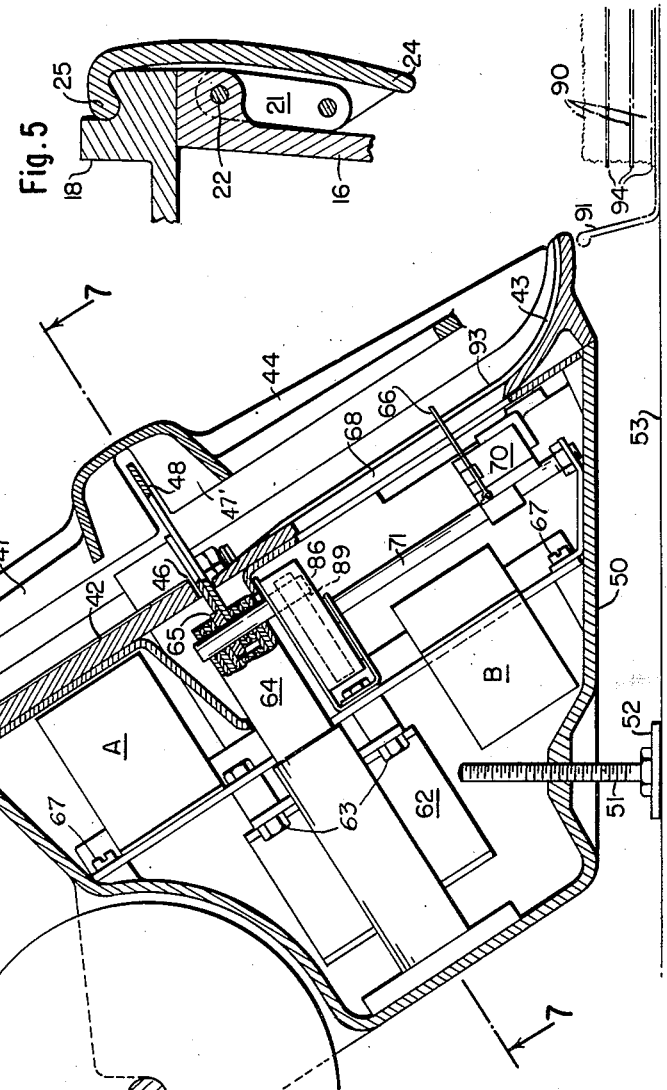
*INVENTORS*
CARL F. SPANG
CHARLES E. CLARKE
BY
*Kenway, Jenney, Witter & Hildreth*
ATTORNEYS June 18, 1957   C. F. SPANG ET AL   2,795,816
HAMBURG PATTY MAKING MACHINE
Filed April 19, 1954   4 Sheets-Sheet 3
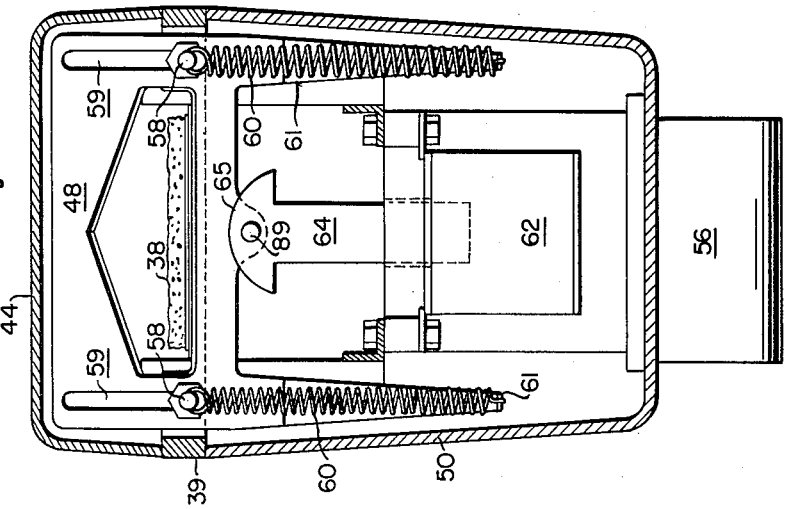
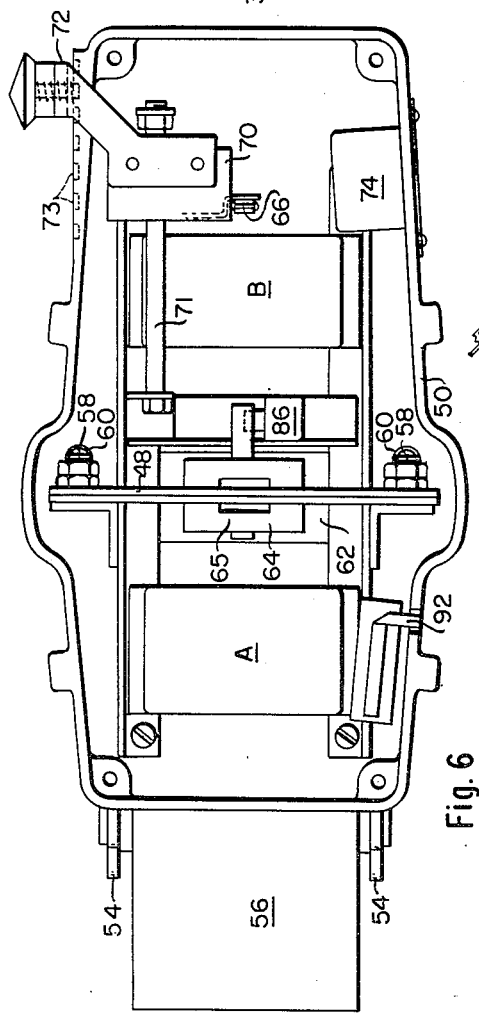
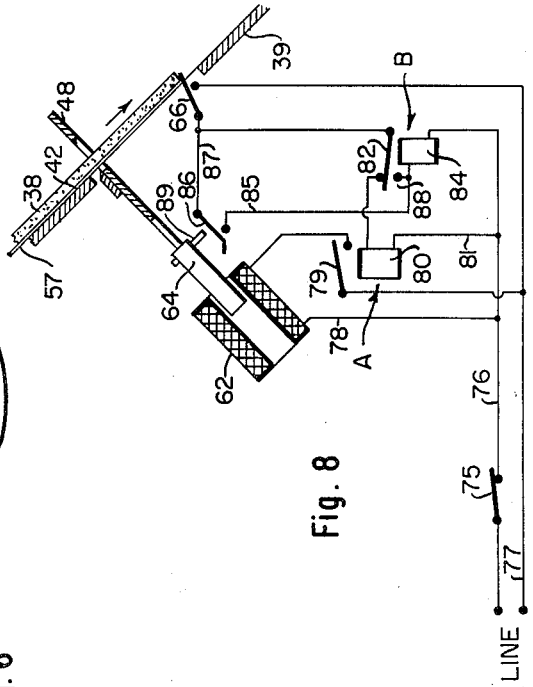
INVENTORS
CARL F. SPANG
CHARLES E. CLARKE
BY
Kenway, Jenney, Witter & Hildreth
ATTORNEYS June 18, 1957   C. F. SPANG ET AL   2,795,816
HAMBURG PATTY MAKING MACHINE
Filed April 19, 1954   4 Sheets-Sheet 4
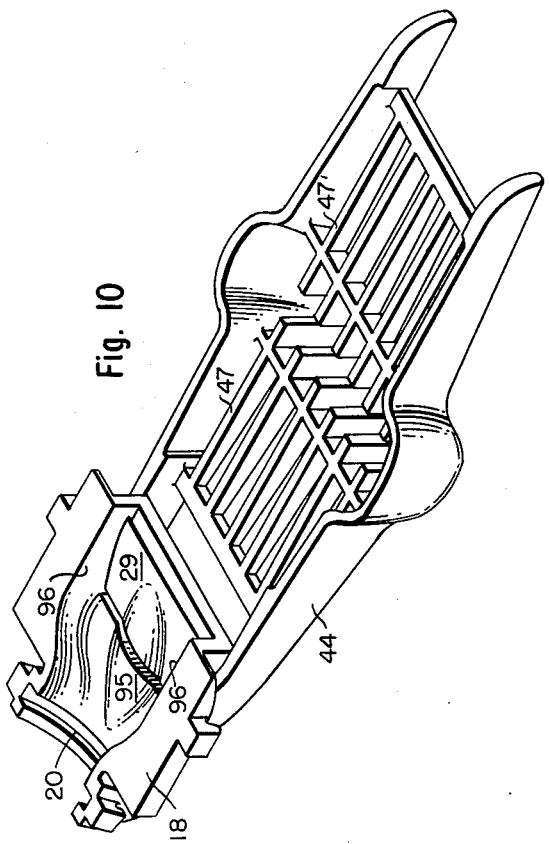
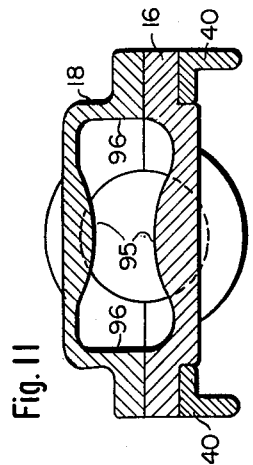
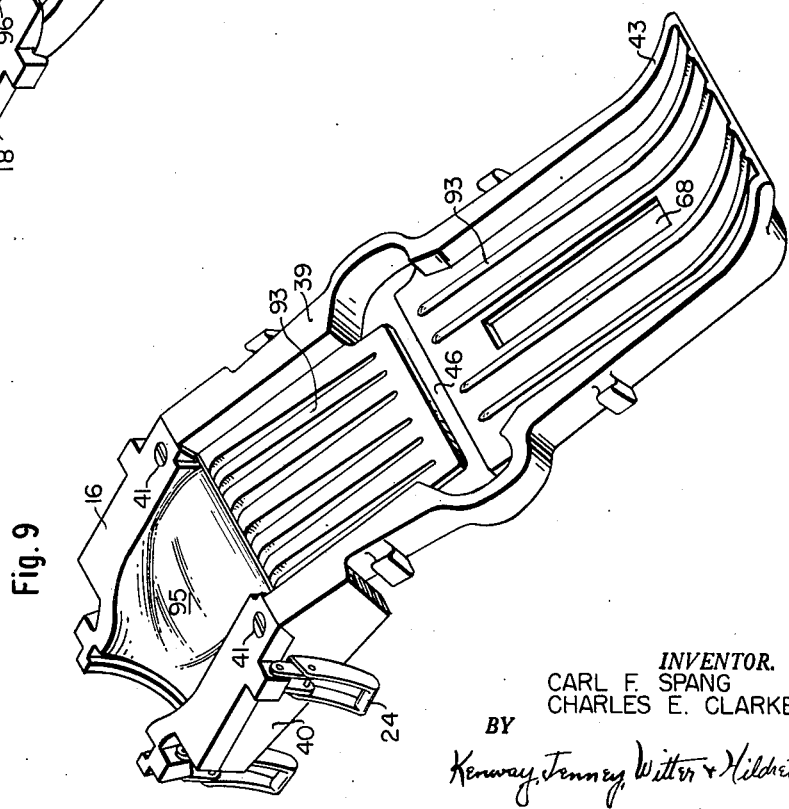
*INVENTOR.*
CARL F. SPANG
CHARLES E. CLARKE
BY
Kenway, Jenney, Witter & Hildreth
ATTORNEYS United States Patent Office 2,795,816
Patented June 18, 1957

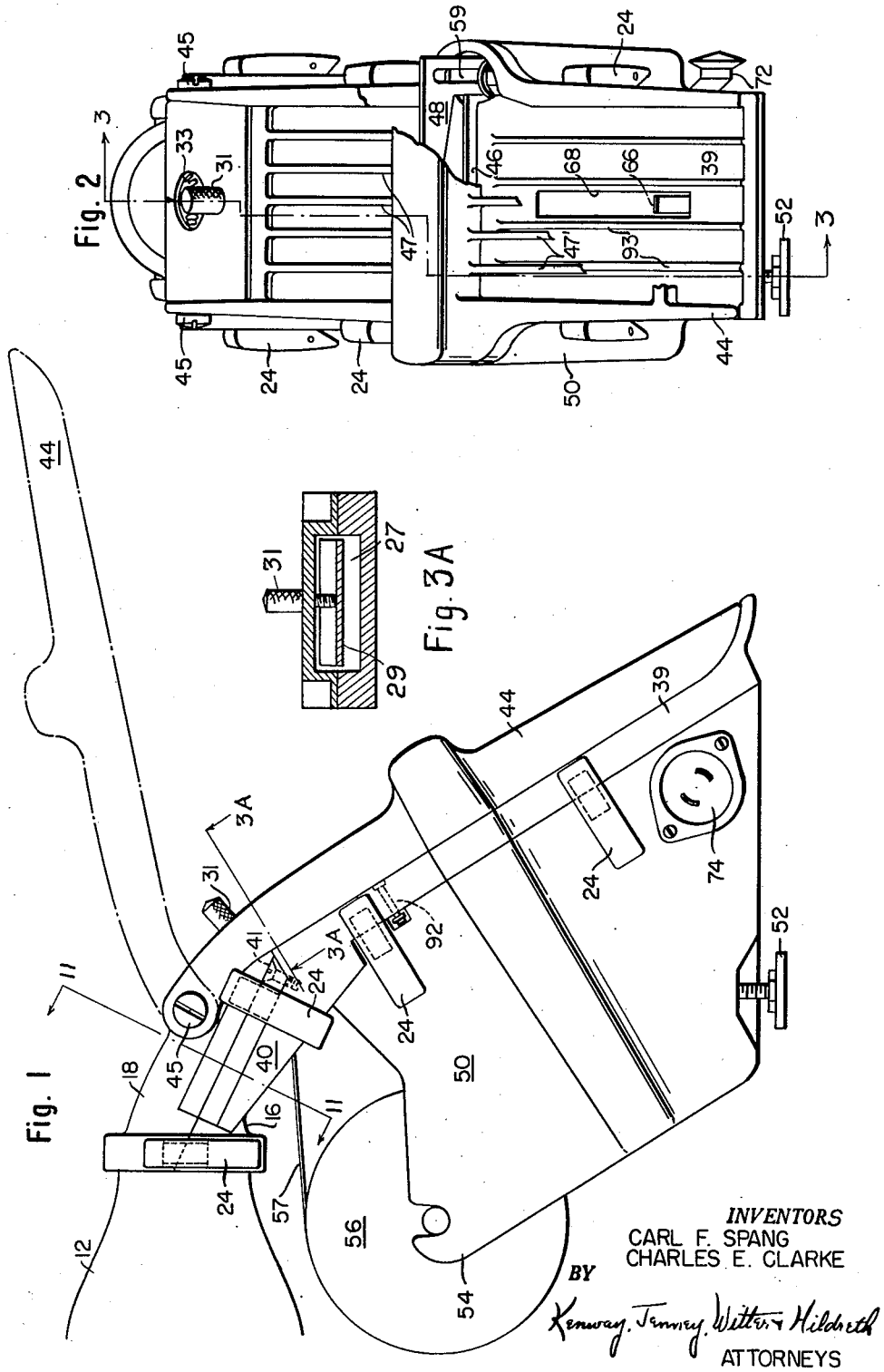

2,795,816
HAMBURG PATTY MAKING MACHINE
Carl F. Spang, Wellesley, and Charles E. Clarke, Winchester, Mass., assignors to Needham Manufacturing Company Inc., Needham Heights, Mass., a corporation of Massachusetts Application April 19, 1954, Serial No. 423,878

16 Claims. (Cl. 17—32)

This invention relates to a novel and improved machine for making hamburg patties. The primary object of the invention resides in the production of a small and relatively simple machine, preferably of a form to be attached to a meat grinder, for rapidly and automatically extruding ground meat and forming it into patties of desired size and thickness. The machine embodies a downwardly inclined tray together with a guillotine knife for receiving the extruded product and rapidly cutting it into patties, the downward inclination of the tray serving rapidly to remove the patties by gravity as they are severed from the extruded product.

The knife is preferably solenoid operated and an important feature of the invention relates to novel tripping mechanism in the path of movement of the extruded product for automatically controlling the operation of the knife, such mechanism being adjustable to vary the length of the patties cut from the extruded strip. The novel controlling mechanism also includes means for preventing operation of the knife until the last prior patty cut from the extruded strip has left the tripping mechanism. Such means in association with the speedy removal of the patties by gravity serves to provide rapid and accurate severing and delivery of the patties. The production of a machine of this nature and embodying these and other novel features hereinafter more fully described comprises a further object of the invention.

These and other features of the invention will be best understood and appreciated from the following description of a preferred embodiment thereof selected for purposes of illustration and shown in the accompanying drawings in which—

Fig. 1 is a side elevation of a machine embodying the invention in the form of an attachment applied to a meat grinder, Fig. 2 is a plan view of the machine, partially broken away, Fig. 3 is a vertical longitudinal section through the machine on line 3—3 of Fig. 2, Fig. 3A is a reduced scale sectional view taken on line 3A—3A of Fig. 1, Fig. 4 is an enlarged plan view of a detail, Fig. 5 is an enlarged fragmentary sectional view of a quick release clamp employed in the machine, Fig. 6 is a plan view of the machine with the top portion removed, Fig. 7 is a sectional view taken on line 7—7 of Fig. 3, Fig. 8 is a fragmentary view diagrammatically illustrating the knife operating mechanism, Fig. 9 is a perspective view of the bottom half of the extruding and tray portion of the machine, Fig. 10 is an inverted perspective view of the top half thereof, and Fig. 11 is a sectional view taken on line 11—11 of Fig. 3.

As illustrated in Fig. 3, our hamburg patty making machine embodies an attachment applied to the delivery end of a meat grinding machine. In the drawings, 10 indicates the clamping ring at the delivery end of the grinding machine and 12 indicates an annular adaptor secured to the grinding machine by the clamping ring. The free end of the adaptor is provided with an annular rib 14 to receive and support the attachment comprising the invention.

The extruding apparatus comprises a lower half 16 and a complemental upper half 18 both channeled at 20 at their meat receiving ends to receive the rib 14. The lower half 16 carries a plurality of quick release clamps (Fig. 5) each including a link 21 pivoted at one end to the lower half 16 at 22 and at its other end to a member 24 having a hook 25 for engaging the upper half and holding the two halves together and secured to the member 12.

The two halves 16 and 18 of the housing are recessed in complemental halves to provide a chamber 26 with transverse walls 28 converging toward the delivery end which terminates in the relatively wide and shallow rectangular slot 27 shown in Fig. 3A. The outer portion of the upper wall 28 includes a gate 29 pivoted at 30. A rotary internal threaded member 31 carried by the housing 18 is in threaded engagement with a bolt 32 positioned to provide a stop for limiting opening movement of the gate. The member 31 and a cooperating rotary member 33 are disposed in a recess in the housing and held therein by a plate 34, the member 33 being rotatably mounted on the plate and the plate having a key 35 extending into a spline in the bolt 32 and preventing its rotation. The member 31 carries a tooth 36 adapted to engage cooperating teeth 37 on the member 33 for rotating the latter one step at each turn of the member 31. Rotation of the member 31 moves the bolt 32 axially and determines the position of the gate and the thickness of the extruded product. The member 33 is indexed to show its position which corresponds to the open position of the gate.

The apparatus thus far described is adapted to extrude a ribbon-like strip 38 of ground meat outwardly beneath the gate 29. A tray 39 is provided with integral brackets 40 at its upper end disposed beneath the member 16 and secured thereto by screws 41. As illustrated in Fig. 3, the tray includes a platform 42 disposed to receive the ribbon strip 38 from the extruding slot, the tray and platform extending outwardly and downwardly therefrom to an outwardly curved bottom end 43 that facilitates stacking of the patties as illustrated in Fig. 3.

A cover 44 for the tray is pivoted to the member 18 at 45, and includes stripper ribs 47 and 47' extending longitudinally of the cover above and spaced from the platform 42 when the cover is in closed position. The tray is provided with a transverse opening 46 thereacross and a strip severing knife 48 is mounted in the opening. A housing 50 hung from the tray and secured thereto by clamps 24 is provided for containing the knife operating mechanism hereinafter described. A screw 51 threaded into the housing is provided with a large head 52 adapted to rest on a horizontal surface 53 (Fig. 3) and thus aid in firmly supporting the housing and contained mechanism. Brackets 54 integral with the housing are adapted to support a roll 56 of paper 57 disposed to be drawn outwardly and over the platform 42.

The knife 48 is of guillotine type and is mounted for vertical movement on studs 58 extending through vertical slots 59 in the knife. Tension springs 60 anchored to the studs and to the bottom ends of legs 61 depending from the knife are adapted normally to hold the knife in the uppermost position illustrated in Fig. 7. The invention as illustrated in the drawing employs a solenoid 62 for moving the knife downwardly to strip severing position. The core 64 of the solenoid is attached to the knife at 65 and energizing of the solenoid is adapted to move the knife downwardly with a sharp and quick stroke.

The solenoid and cooperating parts within the housing are secured together into a unit by bolts indicated at 63 and the unit is anchored within and to the housing by bolts 67. The housing together with the solenoid operating unit and the knife 48 are removable from the tray by releasing the clamps 24, thereby permitting thorough cleaning of the tray and machine without wetting the solenoid mechanism. The tray and housing 18 are united into a unit by screws 41 and this unit can be conveniently and quickly removed from the housing 12 for thorough washing and cleaning under a faucet. Also, with the housing and knife 48 removed, the machine can be used manually by severing the extruded strip with hand shears.

The movements of the knife are automatically controlled to sever equal length patties from the advancing end of the strip. The mechanism for performing this function includes a switch arm 66 extending upwardly through a slot 68 in the platform 42 and located beyond the knife. The function of the switch arm and associated mechanism is to energize the solenoid and operate the knife when the forward end of the extruded strip comes into contact with the switch arm. The switch box 70 carrying the switch arm is mounted on a rod 71 and is adjustable therealong and along the slot as by means of a bracket 72 having a detent positioned to engage in holes 73, thereby providing for varying the length of patties cut from the strip.

The housing 50 is provided with a socket 74 for connecting the electric power and the solenoid operating mechanism is illustrated diagrammatically in Fig. 8. The machine is under the control of a main switch 75 in one lead 76 of the lines 76 and 77.

The solenoid circuit includes a lead 78 to the line 76 and a lead, including a relay switch 79 of a relay A, to the line 77. The switch 79 is normally open and is adapted to be closed by and when the relay coil 80 is energized. The circuit to the coil 80 includes lead 81 to the line 76 and a lead to the line 77 including a normally closed switch 82 and the normally open switch 66.

The switch 82 is part of a relay B including a coil 84. The line 76 is connected directly to the coil 84 and the other lead 85 therefrom includes a normally open switch 86 in series circuit with the switch 66 in a line 87. A contact 88 in the line 85 is disposed to be engaged by the switch arm 82 when the coil 84 is energized. The switch 86 is disposed in the path of movement of a pin 89 carried by the knife and solenoid and thus disposed to be closed upon downward movement of the knife to the strip severing position.

As the extruded strip 38 moves forwardly beyond the knife (Figs. 3 and 8) it comes into contact with and closes the switch 66. The relay 80 is thereupon energized and immediately closes the solenoid circuit switch 79, and the knife is quickly drawn downwardly and severs the strip. Near the bottom end of the knife stroke the pin 89 engages and closes the switch 86, thus energizing the relay 84 and moving the switch arm 82 downwardly to the contact 88. The relay 80 is thereupon deenergized, the solenoid circuit opened, thus permitting the knife and solenoid core unit quickly to return to its uppermost position. The ribs 47 serve to strip the severed product from the knife during its upward movement and thereby free the cut patty for immediate movement down the tray. As illustrated in Fig. 3, the stripping ribs 47' above the opening 46 are spaced higher above the tray than are the ribs 47 thereby avoiding possible contact of the oncoming extruded strip with the ribs 47'.

It should be understood that the strip 38 feeds forwardly at considerable speed and the knife must be operated with immediate and instant speed in both directions to serve the automatic function required. Energizing the solenoid performs the forward movement of the knife-solenoid unit with instant speed and the springs 60 are of sufficient strength to perform the return movement with like instant action when the solenoid circuit is broken. Thus the unit is adapted to perform the repeatedly consecutive severing functions with the great speed required to accommodate the feeding of the strip forwardly at substantial speed.

Energizing of the relay 84 (1) breaks the solenoid circuit, (2) shunts the switch 86 and (3) establishes a circuit through the coil 84 and switch 66. It will be apparent that this circuit (3) through the coil 84 maintains the solenoid deenergized so long as the switch 66 is held closed. Thus the knife cannot again operate until the last prior patty cut from the strip has left the switch arm 66. It is pointed out that such arrangement serves as a safety device preventing inadvertent operation of the knife and consequent severing of the strip except as and when its advancing end contacts the switch 66.

It is also pointed out that the downward inclination of the tray and platform 42 serves to quickly move the patties downwardly as they are severed thereby permitting the machine to operate rapidly and without interference by the severed patties, and the extruding of the product onto the paper strip 57 facilitates this function since there is little frictional resistance to movement of the paper downwardly on the tray. Ribs 93 extending longitudinally of the platform 42 also facilitate the sliding of the patties downwardly. The severed patties 90 on their papers 94 are stacked in trays 91 or they may be received on a traveling conveyor carrying them to packaging positions, it being noted that the papers also serve as separators for the stacked patties. A safety switch is provided at 92 for automatically opening the circuit and preventing operation of the knife when the cover 44 is open.

It is desirable that the patties shall remain whole and not frayed at the edges. Such fraying at the side margins has heretofore been experienced, particularly with relatively thin patties, and the following feature of our invention is provided to remedy this objection. The transverse walls 28 of the extruding chamber not only converge longitudinally of the chamber in the feeding direction but, in an area 95 disposed between the side walls 96, these transverse walls diverge outwardly from the center thereof toward the side walls whereby to crowd the meat to the outer marginal areas of the chamber as it moves toward the extruding slot, as illustrated in Figs. 9–11. Thus the extruded product is rendered so relatively dense and firm at the side margins that fraying is eliminated.

While we have herein conveniently described our invention as adapted to the making of hamburg patties, it will be apparent that it is also applicable to the extruding of the various materials and the making of chicken patties, crab meat patties, etc. Also while we have illustrated and described a specific mechanism actuated by forward movement of the paper strip with the extruded ribbon for severing predetermined length patties from the forward end of the extruded product, it is apparent that other mechanism for effecting this function in association with our improved machine can be employed within the scope of the invention.

Having thus disclosed our invention what we claim as new and desire to secure by Letters Patent is:

1. A hamburg patty forming machine, comprising a housing having an extruding chamber extending therethrough and open at feeding and delivery ends, the inner walls of the chamber being gradually inclined from a circular configuration at the feeding end to a relatively wide and shallow rectangular slot disposed horizontally at the delivery end and adapted to extrude ground meat into a flat strip of predetermined width, a strip receiving tray associated with the housing and extending outwardly and inclined downwardly from said slot to receive and support the extruded strip in gravity movement therealong, a strip severing knife disposed transversely of the tray, guide means mounting the knife for movement toward and from the tray, means including power operated mechanism for moving the knife downwardly to sever the strip and upwardly to a position above and spaced over the tray, tripping mechanism including controlling means in the path of movement of the strip beyond the knife and disposed to be operated by contact of the strip therewith for causing the power operated mechanism to operate the knife and sever the strip, and means disposed above the tray for quickly stripping the strip and severed patty from the knife upon upward movement of the knife, the tray extending downwardly beyond the knife in position to receive and guide the stripped patty to a receiving station.

2. The machine defined in claim 1 plus means for adjusting said controlling means longitudinally of the tray to vary the patty length cut from the strip.

3. The machine defined in claim 1 in which the bottom end of the tray curves outwardly toward the horizontal to facilitate automatic stacking of the patties at said station.

4. The machine defined in claim 1 plus a cover attached to the housing and movable to and from an open position exposing the tray and a closed position resting on and substantially parallel with the tray and carrying said stripping means disposed longitudinally of the cover above and spaced from the tray when the cover is in closed position.

5. The machine defined in claim 1 plus a housing for the power means, and means uniting the housing and tray into a unit body.

6. The machine defined in claim 1 plus means for preventing the strip severing operation of the knife until the last prior patty cut from the strip has left the controlling means.

7. A hamburg patty forming machine, comprising a housing having an extruding chamber extending therethrough and open at feeding and delivery ends, the inner walls of the chamber being gradually inclined from a circular configuration at the feeding end to a relatively wide and shallow rectangular slot disposed horizontally at the delivery end and adapted to extrude ground meat into a flat strip of predetermined width, a strip receiving tray associated with the housing and extending outwardly and inclined downwardly from said slot to receive and support the extruded strip in gravity movement therealong, the tray having a narrow transverse opening therethrough, a strip severing knife disposed in said opening, means including power operated mechanism beneath the tray for moving the knife downwardly within the opening to sever the strip and upwardly to a position above and spaced from the tray, tripping mechanism including a controlling member in the path of movement of the strip and disposed to be operated by contact of the strip therewith for causing the power operated mechanism to operate the knife and sever the strip, and means disposed above the tray and said opening for stripping the strip and severed patty from the knife upon upward movement of the knife, the tray extending downwardly beyond the knife in position to receive and guide the stripped patty to a receiving station.

8. The machine defined in claim 7 plus a housing for the power means, means securing the power means to and within the housing, and quickly releasable latch means detachably affixing the housing to the tray.

9. The machine defined in claim 7 in which said power operated mechanism comprises a solenoid having a core connected to the knife and said controlling member includes a switch, and a relay under the control of said switch and including a normally open switch in the solenoid circuit for moving the knife to sever the strip.

10. The machine defined in claim 7 in which said power means comprises a solenoid having a core connected to the knife and said controlling member includes a switch, and means including a second switch and a cooperating abutment movable with the knife for opening the solenoid circuit upon movement of the knife to the strip severing position.

11. The machine defined in claim 10 in which the last named means includes a relay under the control of said second switch for effecting the opening of the solenoid circuit.

12. The machine defined in claim 11 in which said relay includes a switch for effecting the opening of the solenoid circuit and establishing a circuit through the relay and through the first named switch, thereby preventing solenoid operation of the knife until the first named switch has opened.

13. The machine defined in claim 7 plus a cover pivoted to the housing for movement to and from the open position exposing the tray and a closed position resting on and substantially parallel with the tray and carrying said stripping means, said stripping means comprising spaced ribs disposed longitudinally of the cover above and spaced from the tray when the cover is in closed position and with the ribs below said opening spaced further from the tray than the ribs above the opening.

14. An apparatus for extruding ground meat into a flat strip of predetermined width, comprising a housing having a substantially rectangular extruding chamber provided with top, bottom and side walls extending therethrough and open at feeding and delivery ends, the opening at the delivery end being a relatively wide and horizontally disposed rectangular slot and the meat contacting surfaces of the top and bottom walls of the chamber converging from the feeding end toward the slot in an area disposed between the side walls thereof, and the meat contacting surfaces of the top and bottom walls diverging outwardly from the center thereof toward the side walls whereby to crowd the meat to the outer marginal areas of the chamber as it moves toward the slot.

15. In a machine of the class described, means for supporting and conducting a strip of material along a predetermined path, an electric circuit, a solenoid in the circuit, a knife disposed transversely of said path and operatively connected to the core of the solenoid, the knife and core comprising a movable unit and energizing of the solenoid being adapted to move the unit forwardly to sever the strip, resilient means for returning the unit to initial position, tripping mechanism including an electric switch in the circuit and means in the path of movement of the strip beyond the knife and disposed to be operated by contact of the strip therewith for energizing the solenoid to sever the strip, and means including a second switch associated with the circuit and solenoid for automatically breaking the circuit and permitting return of the unit to initial position at a predeterminad point in the forward travel of the unit.

16. In a machine of the class described, means for supporting and conducting a strip of material along a predetermined path, a knife disposed transversely of said path, power operated mechanism including an electric circuit for moving the knife forwardly to sever the strip, resilient means for returning the knife to initial position, tripping mechanism including an electric switch in said circuit and means in the path of movement of the strip beyond the knife and disposed to be operated by contact of the strip therewith for causing the power operated mechanism to operate the knife and sever the strip, and means including a second switch associated with said circuit and said power operated mechanism for automatically breaking the circuit and permitting return of the knife to initial position at a predetermined point in the forward travel of the knife.

References Cited in the file of this patent

UNITED STATES PATENTS

| | | |
|---|---|---|
| 1,699,086 | Winkie | Jan. 15, 1929 |
| 2,014,384 | Kruttschnitt | Sept. 17, 1935 |
| 2,209,824 | Louisot et al. | July 30, 1940 |
| 2,299,314 | Elesh et al. | Oct. 20, 1942 |
| 2,397,446 | Tansley | Mar. 26, 1946 |
| 2,539,232 | Dempster | Jan. 23, 1951 |
| 2,712,101 | Salati | June 28, 1955 |
| 2,716,206 | Salati | Aug. 23, 1955 |